Figure 1:
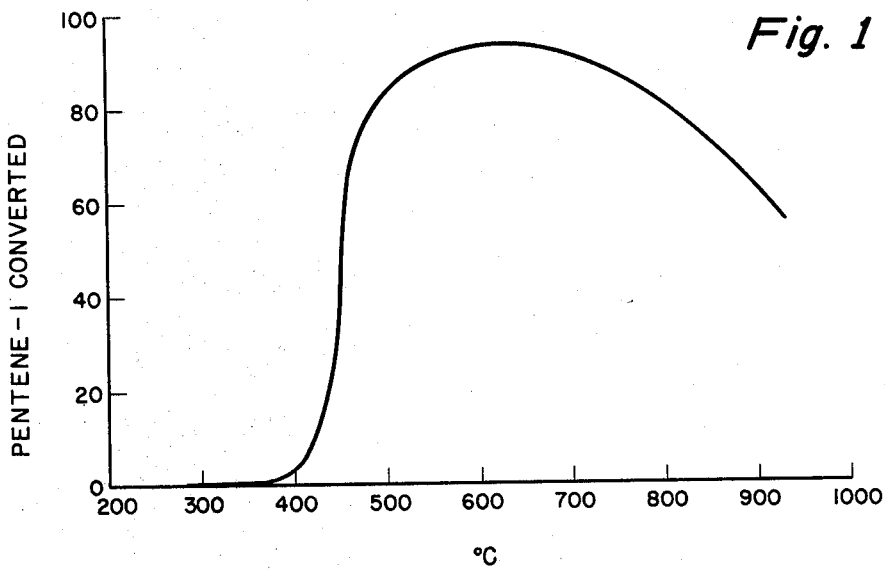

July 12, 1966    T. M. O'GRADY ET AL    3,260,679
METHOD OF PREPARING A CATALYST COMPOSITION CONSISTING
OF SODIUM, SODIUM CARBONATE AND IRON OXIDE
ON ALUMINA AND THE PRODUCT THEREOF
Filed May 25, 1962    3 Sheets-Sheet 1

INVENTORS:
Thomas M. O'Grady
Arnold N. Wennerberg
BY Fred R. Ahlers
ATTORNEY

INVENTORS:
Thomas M. O'Grady
Arnold N. Wennerberg
BY
ATTORNEY

United States Patent Office 3,260,679
Patented July 12, 1966

3,260,679
METHOD OF PREPARING A CATALYST COMPOSITION CONSISTING OF SODIUM, SODIUM CARBONATE AND IRON OXIDE ON ALUMINA AND THE PRODUCT THEREOF
Thomas M. O'Grady, Chicago Heights, and Arnold N. Wennerberg, Chicago, Ill., assignors to Standard Oil Company, Chicago, Ill., a corporation of Indiana
Filed May 25, 1962, Ser. No. 197,728
7 Claims. (Cl. 252—443)

This invention relates to a catalyst composition containing metallic sodium on an alumina support wherein the activity of the supported metallic sodium is promoted and more particularly pertains to a catalyst containing metallic sodium on a gamma-type alumina support wherein metallic sodium is promoted with at least a transition metal compound. This invention also pertains to a method of preparing said promoted sodium on alumina support.

Metallic sodium with or without various supports has been proposed as a catalyst for a number of chemical processes. For example, metallic sodium has been proposed as a catalyst for the polymerization of mono-olefins, di-olefins (dienes) and skeletal isomerization of chemical compounds wherein a change in the physical conformation of a carbon chain is obtained. For certain processes the supported metallic sodium catalysts were not effective in that the desired catalytic activity occured at such temperatures which resulted in a chemical change of the material being treated or resulted in the polymerization of unsaturated feed compounds being treated. Such chemical changes are, of course, undesirable where it is desired to convert the feed to an isomeric form and the isomer is to be used as an intermediate for the preparation of other chemical compounds.

We have discovered a nonpyroforic, active and selective supported promoted sodium catalyst which can be readily prepared and is safe to handle in chemical processing equipment. This catalyst comprises 1 to 25 weight percent metallic sodium and 0.1 to 10 weight percent transition metal compound, preferably a compound of iron on a metal oxide support, such as activated aluminas, silica, magnesia and the like as well as naturally occurring materials, such as bauxite, kieselguhr and boemite among others. Desirably the supports contain mainly alumina converted or convertible to gamma-type aluminas. Although some of the natural alumina-containing metal oxides also contain transition metal compounds especially iron oxides, not all of the iron oxide present satisfies the amount necessary for the aforementioned promoter proportions. We have found that a substantial amount of the iron oxide content of said naturally occurring aluminas appear to be chemically or otherwise bound with the other oxides or other elements present to make the iron oxides substantially unavailable for its full promoting effect. In most cases the iron content of the naturally occurring alumina-containing metal oxides may be disregarded.

The gamma-type aluminas are designated by A. S. Russell et al. in "Alumina Properties," published as Technical Paper No. 10 by the Aluminum Company of America, as chi-, gamma-, eta-, delta-, kappa-, and theta-alumina. The gamma-type aluminas are characterized by being substantially anhydrous and having high surface areas, on the order of 150-400 square meters per gram. They are obtained by calcining alpha- or beta-alumina trihydrates, or alpha-alumina monohydrates at elevated temperatures less than the temperature at which corundum (alpha-alumina) commences to form. A suitable alumina is gamma-alumina calcined at 400-600° C. The particle size of the alumina may vary from that of a fluidizable powder up through granular size. The alumina may also be shaped into the form of pellets, tablets, beads, or other configurations having a maximum dimension, approximately ¼ inch. After the alumina has been calcined to a substantially anhydrous condition, it is desirable that such precautions be taken as are necessary to preclude the adsorption of water or oxygen by the alumina.

One component of the catalyst is metallic sodium, which may be the metallic sodium generally available as an article of commerce. The sodium is added to the alumina by first heating the alumina in a dry inert atmosphere to a temperature in the range of about 200–600° C., preferably in the range of about 300–500° C., and advantageously to 400° C. The sodium may be added as small pea-size pieces. The amount of metallic sodium used should be in the range of about 1 to 25 weight percent of the final catalyst, preferably 3 to 10 weight percent, and advantageously about 6 weight percent. It is desirable to add a sufficient amount of metallic sodium to provide a monoatomic layer of sodium on the supporting gamma-type alumina, and accordingly, since suitable aluminas vary somewhat in surface area, the amount of sodium used will be correlated with the surface area of the particular alumina in question. The sodium is advantageously freshly cut and free from sodium oxide. However, the presence of sodium oxide does not impair the effectiveness of the catalyst, but should be taken into account in determining the amount of metallic sodium added to the alumina. After the metallic sodium has been added to the alumina, the mixture is mechanically stirred for a period of about 15 to 25 minutes, preferably about 20 minutes, at a temperature within the foregoing ranges. During the stirring, the metallic sodium is dispersed over the surface of the alumina.

A third component of the catalyst comprises a compound of a transition metal. As used herein, the phrase "transition metal" refers to those elements selected from Periods 4, 5, 6 of the long form of Periodic Table, as set forth in Kirk-Othmer's "Encyclopedia of Chemical Technology," volume 5, page 670, having atomic numbers of 21 through 32, 39 through 51, and 57 through 84, inclusive. Of these, titanium, vanadium, chromium, manganese, iron, cobalt, nickel, copper, and zinc (all of which are in Period 4), zirconium, molybdenum, cadmium, tin, and antimony (all in Period 5), platinum, mercury, lead, and bismuth (from Period 6) are preferred. The transition metal may be added as a carbonate, sulphate, nitrate, or as an ester, such as an acetate, but because of convenience and ease in handling, the oxides are preferred. Halides of the metals may be used, but are less desirable. The use of nitrates of the transition metal as promoters for the sodium contributes an additional advantage in that the resulting catalyst reaches its ultimate high activity sooner. For example, in the conversion of pentene-1 to pentene-2 at −78° C. with two different catalysts, each containing 6.2 percent sodium and 1.5 percent $Fe_2O_3$ on the same gamma-type alumina support, the one prepared by using powdered $Fe_2O_3$ reaches its optimum activity of about 95 weight percent conversion of pentene-1 in 50 to 60 minutes. In contrast to this the catalyst prepared from ferric nitrate as a source of $Fe_2O_3$ reached its optimum ultimate activity of about 96–98 weight percent conversion in 11 to 13 minutes. Both times are after initial contact of the catalyst with pentene-1 feed. The amount of a transition metal used is generally in the range of about 0.1 to 10 weight percent of the completed catalyst, preferably 0.5 to 5 percent and advantageously 1 to 2 percent.

The transition metal compound is preferably incorporated into the alumina prior to the addition thereto of the metallic sodium, but is preferably added to the mixture of metallic sodium and alumina at the end of the above-described 15 to 25 minute mixing period, and while the sodium-alumina mixture is at an elevated temperature, advantageously at about 400° C. The metal compound may be added in the form of a powder and dispersed through the sodium-alumina mixture by stirring for a period of 10 to 20 minutes, advantageously about 15 minutes, while the catalyst undergoing preparation is maintained at the elevated temperature.

At the end of the mixing of the transition metal component with the metallic sodium and alumina, the catalytic mixture is preferably cooled as rapidly as possible to a moderate temperature, such as 100° F. or below. The thus formed catalyst may be used immediately or kept in storage for a period of time prior to use. However, it is desirable to exclude halogens, hydrogen, halides, water, either liquid or vapor, and oxygen from contact with the catalyst, and to that end an inert atmosphere of nitrogen or helium may be used.

An additional promotional effect, i.e., over and above the promotional effect of the transition metal compound, can be achieved by also adding to the supported metallic sodium containing the transition metal compound promoter an alkaline earth (Group IIA) compound, preferably their oxides and hydroxides, and carbonates of alkali metals, preferably the carbonates of sodium. These materials promote the effect of the transition metal compounds. These promoter-promoting compounds are added to provide them in the catalyst in the range of from 0.4 to 2.0 weight percent. The effect of the promoter-promoting alkaline earth oxide and hydroxides and sodium carbonate is to increase the ultimate activity of the catalyst and at the same time cause the catalyst to provide its higher ultimate activity with a shorter initiation period, at a shorter time after initial contact with the feed for the process in which it is being used. For example, in the conversion of pentene-1 to pentene-2 at −78° C. the use of a catalyst containing 6.2 percent sodium, 1.5 percent $Fe_2O_3$ and 0.6 percent sodium carbonate on a gamma-type alumina reached its optimum activity of 97 to 98 percent conversion in 12 to 14 minutes. A catalyst containing 6.2 percent sodium, 1.5 percent $Fe_2O_3$ and 0.6 percent calcium hydroxide on gamma-type alumina reached its optimum activity of 98 to 99 percent conversion of pentene-1 in 3 to 4 minutes. For purposes of comparison, a catalyst containing only 6.2 percent sodium on gamma-type alumina converted pentene-1 to pentene-2 at −78° C. at a conversion activity of from 2 to 5 percent over a period of 4 to 16 minutes. The 5 percent conversion of supported sodium alone appeared to be the optimum at this temperature.

Figure 2:
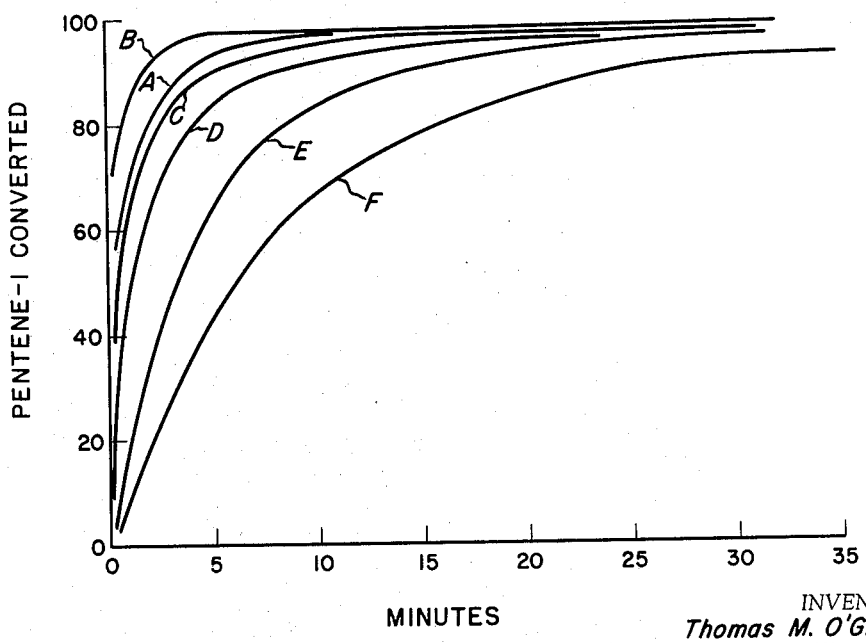

In the accompanying drawings containing FIGURES 1 through 6 there is illustrated the activity of the catalyst of this invention as well as the effect of the pretreatment of alumina-containing supports. FIGURE 1 illustrates the effect of calcination temperature on the alumina support over calcination temperatures of from 300 to 900° C. After calcination 4 percent sodium was deposited on the alumina and then contacted with pentene-1 at 0° C. In FIGURE 2 the effect of various transition metal oxide promoters on a catalyst containing 6.2 percent sodium and varying amounts of promoters is illustrated. In this case the gamma-type alumina support was the same and had received the same calcination treatment. The catalytic effect of the resulting catalysts was measured by pentene-1 conversion at −78° C. The promoters used in these catalysts as keyed to the letter designations for the curves in FIGURE 2 are as follows:

TABLE 1

| Curve: | Promoter |
|---|---|
| A | 5% Ammonia synthesis catalyst [1] |
| B | 1.5% $Fe_3O_4$ |
| C | 2.3% ZnO |
| D | 1.5% $Fe_2O_3$ |
| E | 1.7% $ZrO_2$ |
| F | None |

[1] Approximate composition: 61 percent $Fe_2O_3$; 34 percent FeO, and 5 percent $SiO_2$, $K_2O$, $Al_2O_3$, CaO.

Figure 3:
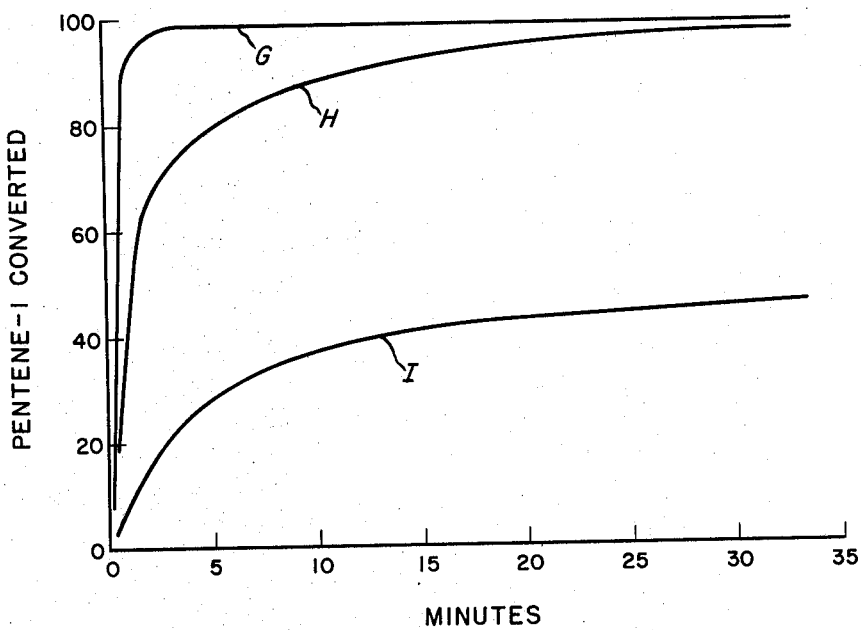

In FIGURE 3 there is illustrated the effects of the iron content in a commercial alumina after certain treatments to remove iron. The treated aluminas were calcined at the same temperature and thereafter 4 percent sodium was deposited thereon. The sodium supported catalyst was contacted with pentene-1 at 0° C. Curve G illustrates the activity of the catalyst without iron removal (Fe: 0.076 weight percent), Curve H illustrates the activity of the catalyst after removal of iron by magnetic process so that the residual iron (as Fe) was 0.046 percent, and Curve I illustrates the activity of the catalyst after the alumina support had been first washed with acid and water and then calcined so that the residual iron content was 0.035 percent.

Figure 4:
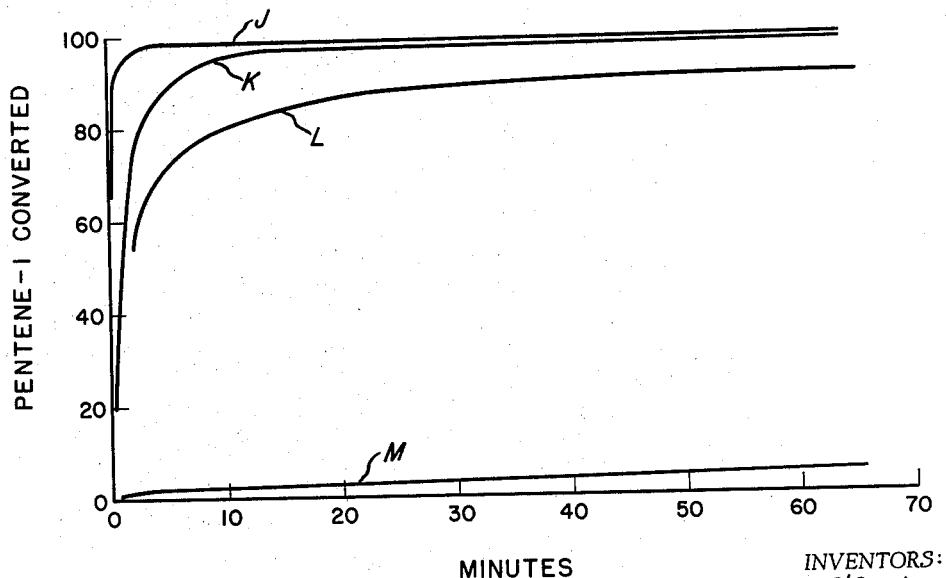

FIGURE 4 illustrates the activity of three catalysts for converting pentene-1 to pentene-2 at −78° C. wherein the alumina support was obtained from a calcined gel-type alumina, all three catalysts contain 6.2 weight percent sodium and 1.5 percent $Fe_2O_3$. The catalysts of Curve J also contain 0.6 percent calcium hydroxide, and the catalysts for Curve K contain 0.6 percent sodium carbonate. The catalysts for Curve L contain no promoter-promoting material. The catalysts for Curve M, given for comparative purposes, contain 6.2 percent sodium on the same calcined alumina obtained from a gel-type alumina but contain no promoter or promoter-promoting compound. The foregoing gel-type aluminas, of course, were acid and water washed before calcination.

Figure 5:
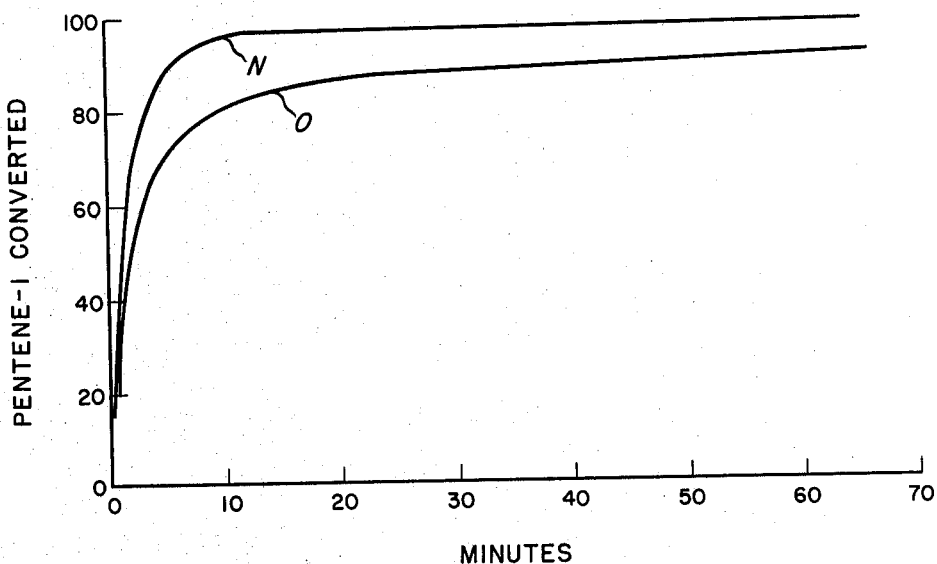

FIGURE 5 illustrates catalysts of this invention containing 6.2 percent sodium and 1.5 percent $Fe_2O_3$ wherein the $Fe_2O_3$ was obtained from ferric nitrate (Curve N) and powdered $Fe_2O_3$ (Curve O). Again the activity of these catalysts is illustrated by the conversion of pentene-1 to pentene-2 at 78° C.

Figure 6:
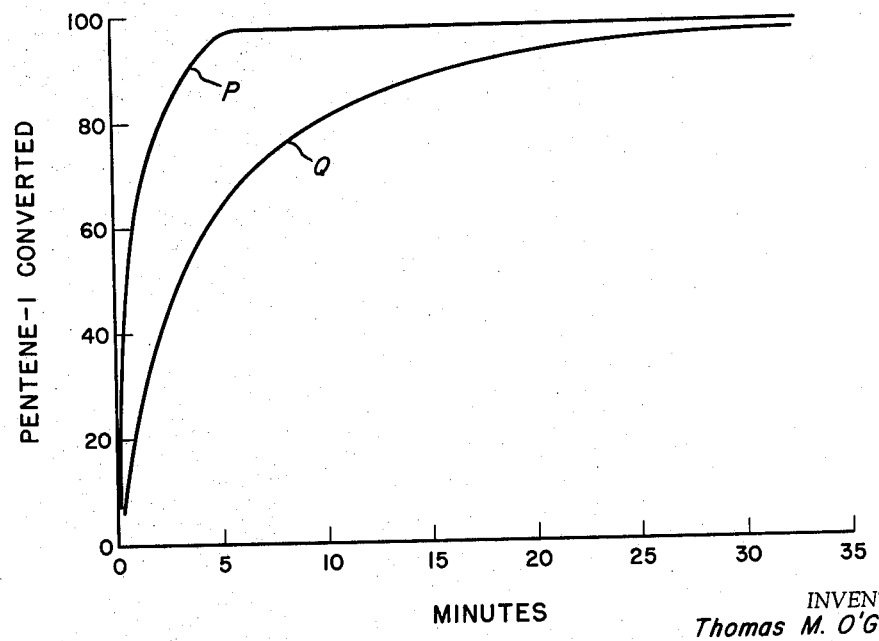

FIGURE 6 illustrates the effect of adding sodium first: curve P and adding $Fe_2O_3$: curve Q. The effects of these catalysts are illustrated by the conversion of pentene-1 to pentene-2 at −78° C. These catalysts contain 6.2 percent sodium and 1.2 percent $Fe_2O_3$.

In the following description "F-1 Commercial Alumina" is an alumina containing 0.058 percent iron, 0.0001 percent copper, 0.004 percent manganese, 0.0095 percent titanium, 0.24 percent sodium (in combined state), and 0.056 percent calcium.

In some cases the preparation of the support is critical. This is true, generally, for supports which in addition to having physically bound water can also have OH groups on its surface. These would include the metal oxide supports such as activated (gamma- or eta-type) alumina, silica, magnesia, etc., and naturally occurring materials such as bauxite, kieselguhr, boemite, etc., which contain these oxides. In the case of the metal oxide supports, such as alumina, optimum calcination conditions of temperature, pressure and time exist. These optima are, furthermore, a function of alkali metal and promoter content of the catalyst, as well as its preparation conditions. To prepare the best catalyst for each alkali metal, promoter, and support combination, experimental measurements for statistical optimization would be required. FIGURE 1 shows the effect of calcination temperature of F–1 alumina on pentene-1 isomerization activity of 4% sodium on the calcined alumina. In this case the alumina was calcined in a horizontal Vycor tube rotated in an electric furnace at about 0.1 mm. Hg for 30 minutes at 300 to 900° C. There was very little conversion of pentene-1 to pentene-2 at 0° C. for this alumina calcined at 300 to 400° C. At 500° C. calcination the conversion was 80% pentene-2, at 700° C. the conversion was 90–95% and at 900° C. calcination the conversion was 62–63%. For most of the alumina-supported catalysts, the alumina can be suitably calcined at 0.01 to 1.0 mm. Hg at about 600° C. for 30 minutes to 2 hours. After the support it dried, it must be handled and used in an atmosphere of a dry, inert gas.

One preferred method of catalyst preparation is as follows: A weighed amount of the calcined support is charged to a suitable 3-neck round-bottom flask provided with a stirrer, inert gas inlet and outlet tubes, and a thermocouple directly contacting the mixing materials. The flask is heated, while stirring the support, to the temperature at which the alkali metal is to be dispersed on the support. Temperatures above the melting point of the alkali metal are usually and preferably used so that it is dispersed as a molten liquid for better contacting. Other methods of dispersing the alkali metal, such as a physical admixture of it and the support, can be used, but they are not as effective. The support and liquid alkali metal are mixed at the preparation temperature for 5 minutes to 3 hours, usually 5 to 30 minutes. Predried promoters are added, and the mixing is continued at the preparation temperature for a specified time which is discussed later. The catalyst, cooled quickly to room temperature or below while mixing, is ready for use.

Preparation of optimum catalysts may be controlled colorimetrically. Where sodium and promoter are dispersed on alumina, a series of color changes occur. Initially, the color progresses from white to darkening shades of blue and sometimes, depending on preparation conditions and concentrations, to black. It then regresses to lighter shades of blue, to gray and finally to an off-white. During the latter color sequence a shade of blue is obtained at which catalyst activity is a maximum. These color changes undoubtedly relate to the reactions described below of the sodium and promoter on the support.

Improvement in activity of sodium on alumina for olefin isomerization due to various transition metal oxides, including different iron oxides is shown in FIGURE 2. Although their promotional effects are well demonstrated, the catalysts are probably not optimally promoted since the concentration and valence state distribution of the transition metal significantly affect activity. Although the promotional effects of iron were particularly studied and are reported below, the principles by which promotion from all the transition metals are established.

Partially removing iron by physical (using a magnet) and chemical (acid and water washing) means from the foregoing alumina whose composition is given in detail significantly reduces $Na/Al_2O_3$ activity, as shown in FIGURE 3. When highly purified gel-type alumina (wt. percent Fe 0.005) is used as a support for sodium, almost no activity is obtained without adding promoter (FIGURE 4). It was not possible by the means used to remove all the iron. If these data are extrapolated to zero transition metal content in the support and in the sodium metal itself, no isomerization activity would apparently exist. Furthermore, catalysts comprising sodium alone and sodium on essentially iron-free supports, such as tabular alumina, sodium carbonate, sodium chloride, and others, showed little or no isomerization activity even at room temperature and higher. Therefore, the presence of the transition metal appears to be necessary for activity. Adding 1.5 weight percent $Fe_2O_3$ to the otherwise inactive 6.2 percent Na on gel-alumina greatly improved its activity as FIGURE 4 also shows. Moreover, calcium oxide (added as $Ca(OH)_2$) and sodium carbonate (probably utilized as $Na_2O$) for the $Fe_2O_3$-promoted Na/Indiana Gel are effective copromoters (FIGURE 4). The basic oxides, especially the alkaline earth oxides, probably add stability to the active promoting species of the iron, and possibly the sodium.

Impregnating the support with iron (via the decomposition of ferric nitrate or other pyrolyzable iron salts from aqueous solution thoroughly mixed with the support prior to its calcination) prior to deposition of the alkali metal, is one preferred way to prepare the promoted catalyst (FIGURE 5). When iron oxide is added as a powder, improved activity is obtained when the sodium is deposited first on the support as FIGURE 6 shows. Presumably this produces a more uniform catalyst.

We have also discovered that supported sodium catalysts promoted with iron have outstanding and optimum activity for olefin isomerization when the catalyst is prepared in such a way to provide an equimixture of iron in the 0 valence state ($Fe^0$) and in the +2 valence state ($Fe^{+2}$). Although the active valence couple for iron is $Fe^0/Fe^{+2}$, not necessarily the same valence couple for the other transition elements is effective. For example, the effective couple for molybdenum may quite possibly be $Mo^{+4}/Mo^{+6}$. A relationship apparently exists between the effective valence couple and the stability of transition metal-olefin coordination complexes. Various degrees of reduction of ferric oxide by sodium for these catalysts were obtained in varying preparation temperature while maintaining the time of interaction of the alumina support constant at 15 minutes. We found that the activiy of iron-promoted $Na/Al_2O_3$ appears to be a function of the valence state distribution of iron, and that a sharp optimum occurs when $Fe^0/Fe^{+2}=1$.

The proper balance of valence state can be accomplished in several other ways. One of these is controlling the time of reduction at a given temperature. Although $Fe_2O_3$ was used in the experiments reported here, other iron oxides, $Fe_3O_4$ and FeO, as well as natural and synthetic sources of these, such as iron ore, waste slag, $NH_3$ synthesis catalysts, etc. and iron compounds such as sodium ferrocyanide as well as mixtures of these can be effectively used. Another method of preparation would be proper reduction of iron oxides on alumina with hydrogen at high temperatures (500° C. or higher), followed by deposition of the sodium at low temperatures (ca. 100° C.) and minimum time such that further reduction by sodium would be negligible. Physical admixtures of the active components Na, $Fe^0$, and a suitable compound of $Fe^{+2}$ with and without a support can also be made, although such a catalyst, because of contacting problems, would probably not be as active. With sufficiently excess sodium present, oxidation of $Fe^0$ where $Fe^0/Fe^{+2}$ greater than 1 to $Fe^0/Fe^{+2}=1$ is another approach. Various combinations of these methods may also be effectively employed.

The overall concentrations of sodium and iron on the support are important, especially in relation to each other. A $Fe_2O_3/Na$ weight ratio of 0:15 to 0.30 on $Al_2O_3$ calcined at 600° C. in vacuum is preferred. Although lower ratios can be used, reduction of catalyst activity occurs rapidly at higher ratios. The total amount of sodium dispersed on a support can be widely varied, 1 to 25%, but generally a concentration approximately providing a monolayer is preferred (ca. 5–6% for F–1 $Al_2O_3$). For metal oxide supports, such as alumina, silica, magnesia, etc., the optimum sodium concentration and $Fe_2O_3/Na$ ratio is a function of the calcination of the support. Hence, a suitable balance among the concentrations of atomic and ionic sodium, the total amount of Fe and its valence state distribution must be maintained.

In a commercial process using these catalysts, contaminants, such as water and oxidants (dissolved oxygen, peroxides, etc.) must be removed from the feed to obtain maximum catalyst life. If contamination due to oxidation occurs, regeneration may be effective with hydrogen at suitable temperature and time to restore the valence couple of the promoter. Furthermore, the use of transition metals which are more passive to oxidation than iron would provide better catalyst life and possibly avoid pretreatment of the feed to remove oxidants. Unless reactive diolefins, such as butadiene and isoprene are removed from the feed, temperatures as low as feasible should be used for the reaction to maximize the life of the catalyst by minimizing coating it with polymer.

Catalysts of this invention and their preparation are hereinafter described in the illustrative examples.

*Example 1*

A catalyst comprising metallic sodium and ferric oxide supported on an F–1 commercial alumina is prepared by calcining the alumina at 600° C. for two hours at a reduced pressure of about 0.1–0.5 mm. mercury. After calcination the alumina is heated to 400° C. in a flask. Metallic sodium (freshly cut and weighed under iso-octane) in the amount of 6.7 g. per 100 g. of alumina are added, and the mixture mechanically mixed for 20 minutes, thereafter 1.3 g. of ferric oxide powder per 100 g. of alumina are added. The ferric oxide powder had been oven-dried at 200° C. The three component mixture was mixed for 15 minutes at 400° C. The catalyst is cooled to room temperature and is ready for use.

*Example 2*

The F–1 alumina is calcined for 30 minutes at 500° C. at reduced pressure. After preheating the alumina for 10 minutes at 400° C., there was combined with each 100 parts by weight of alumina 5 parts by weight of the ammonia synthesis catalyst hereinbefore described and thoroughly mixed with the alumina. Also for each 100 parts of alumina, there was added 4.6 parts of metallic sodium (cut and weighed as described in Example 1), and the three components mixed for 20 minutes. The catalyst may be cooled to room temperature or to a temperature at which it is to be used.

*Example 3*

For each 100 parts by weight of F–1 commercial alumina having granules of 28 to 48 mesh size (U.S. Sieve Standard) calcined for six hours at 500 to 510° C. at atmospheric pressure with an air sweep followed by cooling to 400° C. in a stream of nitrogen, there is added 4.2 parts by weight of metallic sodium cut and weighed as described in Example 1. These two components are mixed for 20 minutes at 400° C. under a flowing nitrogen blanket. This catalyst has the activity illustrated by Curve G of FIGURE 3. It will be noted that the amount of iron in this catalyst is sufficient to provide promotional amount of iron, especially after the alumina had been calcined at the temperature and under the conditions hereinbefore set forth as necessary.

*Example 4*

This catalyst is prepared by washing gel-type alumina with nitric acid using for each 500 parts by weight of alumina one liter of 41 percent nitric acid. The acid washing was carried out for a period of about 13 minutes after which the alumina was settled and separated from the acid. The acid wash was repeated with fresh nitric acid. The alumina twice washed with nitric acid was washed with about 10 liters of distilled water to a neutral pH and then dried overnight at 450° C. This aluminia is calcined at 600° C. at a reduced pressure of 0.1 mm. mercury for two hours, thereafter 6.2 percent sodium, 1.5 percent $Fe_2O_3$ and 0.6 weight percent promoter-promoting compound, such as sodium carbonate or calcium hydroxide is added such as to prepare catalysts illustrated by Curves J and K of FIGURE 4.

Since bauxites are naturally contaminated with significant amounts of various metal oxides that would be effective promoters, they could provide not only excellent supports for metallic sodium, but also might be thought to provide the necessary transition metal promoters. Two bauxites of different iron-oxide content: 14.0 weight percent and 2.5 weight percent, are calcined at 0.03 to 0.04 mm. mercury at 600° C. for two hours. Samples of these calcined bauxites were mixed with metallic sodium to provide on each bauxite 5.0 and 20.0 weight percent sodium. The sodium and calcined bauxite were mixed at 400° C. for 20 minutes. These 4 metallic sodium-on-bauxite catalysts were contacted with 100 ml. of pentene-1 at −79° C. For purposes of comparison, a substantially iron free alumina calcined at 600° C. and about 0.01 mm. mercury for two hours upon which was deposited 6.2 percent sodium and 1.5 percent $Fe_2O_3$ was also contacted with 100 ml. of pentene-1 at −79° C. The ratio of pentene-1 to catalyst in all 5 pentene-1 conversions was substantially the same. The results of some of these conversion tests are tabulated below.

TABLE 2

| Catalyst | Na, wt. Percent | Catalyst Weight, grams | Pentene-1 Half Life at −79° C., minutes |
|---|---|---|---|
| Bauxite: 14.0% $Fe_2O_3$ | 20.0 | 15.0 | 14.0 |
| Bauxite: 2.5% $Fe_2O_3$ | 20.0 | 15.0 | 12.8 |
| Fe Free Alumina, 1.5% $Fe_2O_3$ deposited. | 6.2 | 16.0 | 1.9 |
| Fe Free Alumina, No $Fe_2O_3$ deposited | None | 16.0 | ¹ 950 |

¹ (Extrapolated.)

The foregoing catalyst compositions illustrated in the examples as well as others of this invention can be used for low temperature carbon-to-carbon double bond shifting of terminal mono-olefins, i.e., converting alkene-1 hydrocarbons to alkene-2 hydrocarbons, can be employed in converting hydrocarbons containing a plurality of carbon-to-carbon double bonds in a non-conjugated system to a conjugated system, can be employed to shift double bonds and unsaturated ethers inwardly in a carbon chain towards the oxygen or sulfur atom as in a thioether, can be used to conjugate a double bond with the unsaturation in the cyano group, and may be employed to shift double bonds in tertiary amines having at least one double bond in a carbon chain attached to the amino nitrogen to a position apha-beta with respect to the nitrogen atom. These uses are more specifically described and illustrated in copending application Serial No. 197,599, filed May 25, 1962. These uses will suggest to those skilled in the art many other uses of this invention.

We claim:
1. A catalyst composition consisting essentially of 1 to 25 weight percent sodium and 0.1 to 10.0 weight percent of iron oxide on a gamma-type alumina.
2. A catalyst composition consisting essentially of 1 to 25 weight percent sodium and 0.1 to 10.0 weight percent $Fe_2O_3$ on a gamma-type alumina support.
3. The catalyst composition of claim 2 also containing 0.4 to 2.0 weight percent calcium hydroxide.
4. The catalyst composition of claim 2 also containing 0.4 to 2.0 weight percent sodium carbonate.
5. A method of preparing a catalyst composition consisting essentially of metallic sodium promoted with an oxide of a transition metal of Periods 4 and 5 of the Periodic Table supported on a metal oxide composition consisting essentially of alumina which method comprises calcining said alumina at a temperature above 400° C. and up to 900° C., and depositing on the surface of said alumina metallic sodium and an oxide providing compound of transition metal of Periods 4 and 5 of the Periodic Table to provide from 1 to 25 weight percent metallic sodium and 0.1 to 10.0 weight percent said transition metal oxide.

6. The method of claim 5 wherein metallic sodium is first deposited on said calcined alumina at a temperature above the melting point of sodium and then an iron compound providing oxides of iron as the transition metal compound is deposited on the calcined alumina.

7. A method of preparing a catalyst composition consisting essentially of metallic sodium and an oxide of iron on a gamma-type alumina support which comprises calcining an alumina capable of forming a gamma-type alumina at a teperature of from 500 to 600° C. and depositing on the surface of said resulting gamma-type alumina from the calcined alumina metallic sodium and an iron oxide providing the valence couple $Fe^0Fe^{+2}$ and wherein the weight ratio of iron oxide to sodium is 0.15 to 0.3.

References Cited by the Examiner
UNITED STATES PATENTS

| | | | |
|---|---|---|---|
| 1,914,674 | 6/1933 | Runge et al. | 260—683.2 |
| 2,316,201 | 4/1943 | Wallden et al. | 252—476 X |
| 2,559,323 | 7/1951 | Spillane | 252—474 X |
| 2,583,254 | 1/1952 | Clark | 252—475 X |
| 2,651,598 | 9/1953 | Ciapetta | 252—474 X |
| 2,818,350 | 12/1957 | Kavanagh | 252—476 X |
| 2,835,343 | 5/1958 | Wolff et al. | 252—476 X |
| 2,965,689 | 12/1960 | Roebuck et al. | 252—463 X |
| 2,994,727 | 8/1961 | Appell et al. | 260—683.2 |

FOREIGN PATENTS

| | | |
|---|---|---|
| 621,449 | 6/1961 | Canada. |

OSCAR R. VERTIZ, *Primary Examiner.*

G. T. OZAKI, *Assistant Examiner.*